UNITED STATES PATENT OFFICE.

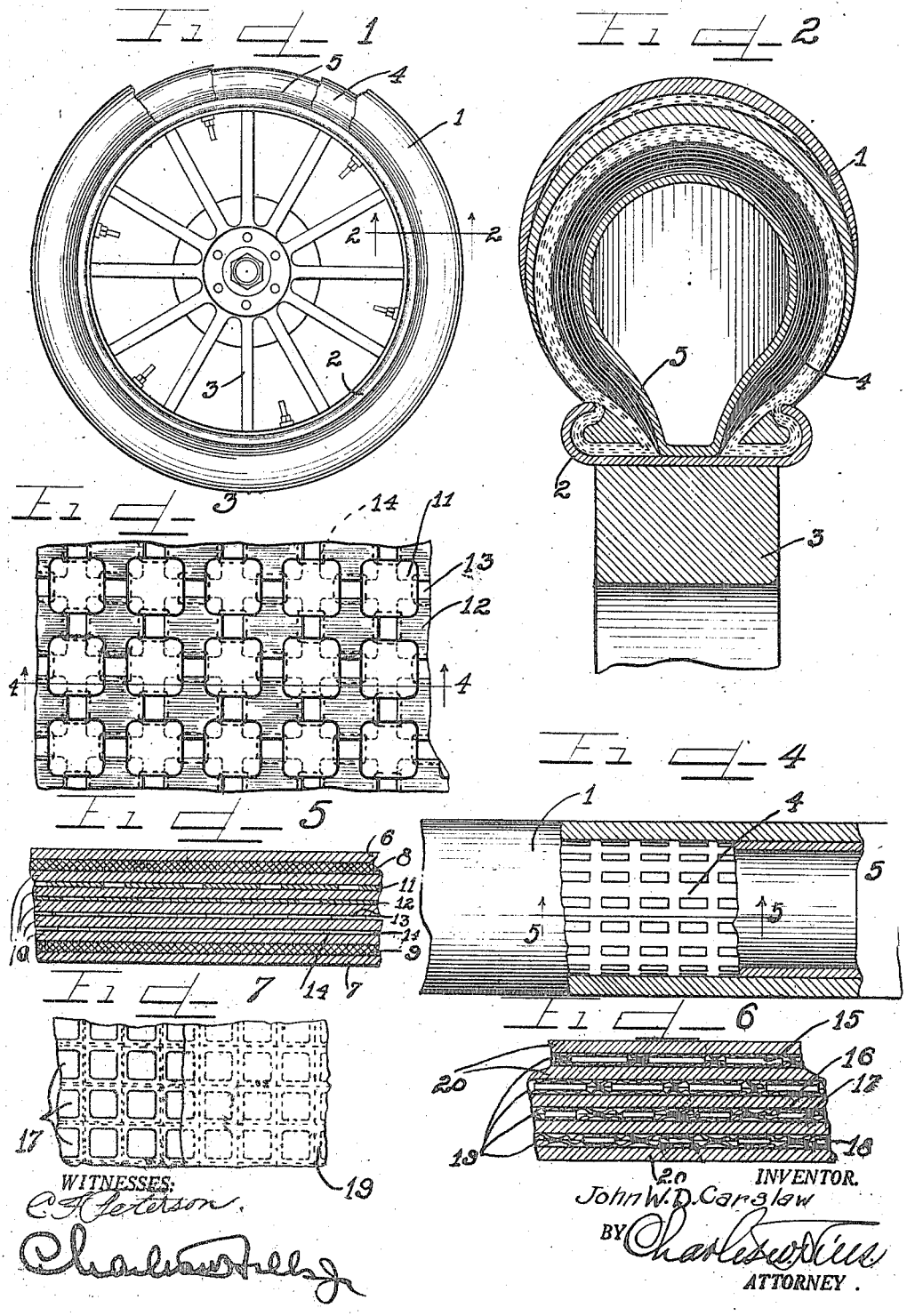

JOHN W. D. CARSLAW, OF PROSPECT, KENTUCKY, ASSIGNOR OF ONE-HALF TO
J. H. LOESER, OF LOUISVILLE, KENTUCKY.

ARMORED INTERLINER FOR TIRES.

1,267,848.  Specification of Letters Patent.  Patented May 28, 1918.

Application filed April 20, 1917. Serial No. 163,347.

*To all whom it may concern:*

Be it known that I, JOHN W. D. CARSLAW, a subject of the King of England, and a resident of the city of Prospect, in the county of Jefferson and State of Kentucky, have invented certain new and useful Improvements in Armored Interliners for Tires; and I do hereby declare that the following is a full, clear, and exact description of the same, reference being had to the accompanying drawings, and to the numerals of reference marked thereon, which form a part of this specification.

This invention relates to a tubular puncture proof tire interliner member adapted to be placed within the usual casing of a pneumatic tire, and adapted to receive the air retaining inner tube therewithin, thus reducing the size of inner tube necessary for the particular casing, and yet retaining all of the resilient qualities of the tire. The invention contemplates the construction of a puncture proof interliner or casing member adapted to receive the usual air inner tube therein, and to be placed within the outer casing of the tire so that the inner air tube cannot be punctured by entrance of foreign objects through the casing member of the tire.

It is an object therefore of this invention to construct a puncture proof inner lining member or casing member for a tire adapted to be placed within the usual outer casing of the tire and to receive the air inner tube therewithin to effectually protect the air inner tube and affording a puncture proof wall between the air inner tube and the usual outer tire casing.

It is furthermore an important object of this invention to construct a built up puncture proof tire interliner adapted to be placed within a tire casing and embodying a series of layers of staggered squares or plates of metal, leather, fiber or composition, each spaced from the other and thoroughly vulcanized into the structure to afford a flexible and yieldable protective member.

Other and further important objects of the invention will be evident from the disclosure in the drawings and specification.

The invention (in a preferred form) is illustrated in the drawings and hereinafter more fully described.

On the drawings:

Figure 1 is a side elevation of a wheel equipped with an interliner embodying the principles of my invention, and with the parts broken away to show the relation of the parts.

Fig. 2 is a transverse sectional detail taken on line 2—2 of Fig. 1.

Fig. 3 is a fragmentary diagrammatic view illustrating the arrangement and superposition of the different size puncture proof square or plate members with the retaining or binding structure omitted.

Fig. 4 is an enlarged fragmentary view with parts in section, showing an inner protective interliner embodying the principles of my invention.

Fig. 5 is a sectional detail on line 5—5 of Fig. 4.

Fig. 6 is a view similar to Fig. 5, of a modified form of structure.

Fig. 7 is a fragmentary plan view with parts broken away, of one of the square layers of the structure shown in Fig. 6.

As shown on the drawings:

The reference numeral 1, indicates as a whole an outer tire casing of any usual and well known construction, which in the present instance is shown secured in a clencher rim 2, upon a wheel 3. Placed within the tire casing 1, is a puncture proof interliner or protective member 4, the edges of which are tapered at the point at which the same contact with the beads of the casing 1, and within said protective interliner is an air inner tube 5. Said interliner 4, is built up of a plurality of layers of different elements and materials, shown clearly in sectional view in Fig. 5. The outer wall or layer is denoted by the reference numeral 6, and consists of gum, rubber, or composition, and the inner layer, which is preferably of the same material, is denoted by the reference numeral 7. Laid next to the outer layer 6, is a fabric layer 8, and similarly, a fabric layer 9, is laid next to the innermost layer 7. Between the fabric layers 8 and 9, are five layers of gum or rubber, all denoted by the reference numeral 10, and interposed therebetween are four layers of small squares or plates, with those of certain layers of different size.

The plates or squares 11, and the plates or squares 12, are substantially the same size, and the same are staggered with their corners overlapping, as clearly shown in Fig. 3. The squares or plates 13, are smaller in size, and are arranged in register with the open spaces existing between the edges of the respective plates or squares 11 and 12, and the plates 14, of the innermost layer, are arranged substantially in line with the plates 12, as shown in dotted lines therebeneath in Fig. 3. Thus the staggered arrangement of the squares or plates affords a network arrangement which prevents projection of any object completely through the interliner. Although the respective square or plate members are shown separated by defined layers of material in Fig. 5, this condition only exists when the structure is first built up, and after vulcanization thereof, the entire structure becomes substantially a unitary member, with the various layers of staggered squares or plates disposed therethrough.

In the modified structure illustrated in Figs. 6 and 7, I have shown the respective metal or square plate members which are denoted respectively by the reference numerals 15, 16, 17 and 18, as stitched between fabric layers 19, so that each plate or square element is disposed within a pocket, and said fabric layers 19, are then placed between gum or rubber layers 20, and the entire structure vulcanized to form a unitary member. The structure thus formed is flexible, yieldable and conforms to all deformations imposed upon the tire, and yet resists piercing of the inner air tube 5, by projection of any objects through the outer casing 1, of the tire.

I am aware that the details of construction may be varied through a wide range without departing from the principles of this invention, and I therefore do not purpose limiting the patent granted otherwise than necessitated by the prior art.

I claim as my invention:

1. The combination with a tire casing, and an inner tube, of an interliner disposed therebetween and comprising a plurality of layers of rubber, and a plurality of layers of staggered plate elements vulcanized between the layers of rubber, said layers of plate elements comprising plates of different sizes and arranged with the larger plates disposed in the outer portion of the interliner and with the smaller plates disposed in the inner portion thereof.

2. The combination with a tire casing, and an inner tube, of an interliner disposed therebetween and comprising a plurality of layers of rubber, a plurality of layers of fabric members sewed together to form pockets and disposed between said layers of rubber, and plate members disposed in said pockets in staggered relation with respect to each other.

In testimony whereof I have hereunto subscribed my name in the presence of two subscribing witnesses.

JOHN W. D. CARSLAW.

Witnesses:
  CHARLES W. HILLS, Jr.,
  EARL M. HARDINE.